(12) United States Patent
Aso

(10) Patent No.: US 6,568,136 B2
(45) Date of Patent: May 27, 2003

(54) METHOD FOR BUILDING A FLOOR DESIGNATED TO UTILIZE THE HEAT STORED IN THE EARTH, AND THE CONSTRUCTION OF A FLOOR BUILT USING SUCH METHOD

(75) Inventor: Kunio Aso, Kawagoe (JP)

(73) Assignee: Yashima Inc., Kawagoe (JP)

( * ) Notice: Subject to any disclaimer, the term of this patent is extended or adjusted under 35 U.S.C. 154(b) by 0 days.

(21) Appl. No.: 09/900,957

(22) Filed: Jul. 10, 2001

(65) Prior Publication Data

US 2003/0009960 A1 Jan. 16, 2003

(51) Int. Cl.[7] .............................. E04B 1/74; E02D 27/01
(52) U.S. Cl. ..................... 52/169.11; 52/295; 52/745.05
(58) Field of Search ........................... 52/403.1, 405.1, 52/169.11, 294, 745.05, 414, 432, 741.11, 742.14, 295

(56) References Cited

U.S. PATENT DOCUMENTS

| 4,142,344 A | * | 3/1979 | Palmaer | 52/169.11 |
| 4,383,521 A | * | 5/1983 | Bounds | 126/616 |

FOREIGN PATENT DOCUMENTS

| JP | 7-158158 | * | 6/1995 |
| JP | 7-173887 | * | 7/1995 |
| JP | 9-228386 | * | 9/1997 |
| JP | 10-266408 | * | 10/1998 |
| JP | 2000-192566 | | 7/2000 |

* cited by examiner

Primary Examiner—Korie Chan
(74) Attorney, Agent, or Firm—Wenderoth, Lind & Ponack, L.L.P.

(57) ABSTRACT

A method for building a floor in a structure, such as a house, is designed to utilize the heat stored in the earth. The method includes the steps of (a) building a continuous footing (1) made of concrete on a location that corresponds to the location of an outer circumferential groundsill that is planned to be built around the outer circumference of a structure being built, (b) providing a stone layer (5) inside the continuous footing (1) by placing stones (4) to cover all of the area on the planned floor location, (c) placing the outer circumferential groundsill (10) on the continuous footing (1), (d) placing an inside groundsill (15) inside the outer circumferential groundsill (10) and across the outer circumferential groundsill (10) so that the inside groundsill (15) can have its upper edge flush with the upper edge of the outer circumferential groundsill (10), (e) placing concrete for forming an underfloor concrete layer (25) along the respective upper edges of the outer circumferential groundsill (10) and inside groundsill (15) within the planned floor location and then flattening the upper surface (26) of the resulting underfloor concrete layer (25), and (f) placing flooring finish boards or slabs (31) on the flattened surface (26) of the underfloor concrete layer (25) after the concrete becomes hardened. The floor (32) that is finally obtained is capable of utilizing the heat stored in the earth and the like. The inside groundsill (15) has anchor bolts previously installed that permit an easy mounting of columns or posts on the inside groundsill.

6 Claims, 11 Drawing Sheets

METHOD FOR BUILDING A FLOOR DESIGNATED TO UTILIZE THE HEAT STORED IN THE EARTH, AND THE CONSTRUCTION OF A FLOOR BUILT USING SUCH METHOD

BACKGROUND OF THE INVENTION

1. Field of the Invention

The present invention relates to a method for building a floor that is designed to make a direct use of the heat stored in the earth and the like, and the construction of the floor that will be built by using such method.

2. Description of the Prior Art

Generally, the earth is kept at a constant temperature in relation to the air in the atmosphere surrounding it. That is, the temperature will remain almost unchanged despite the change in the surrounding air temperature that occurs from season to season. Thus, the earth temperature is relatively warm in winter, and is relatively cool in summer. In order to take advantage of the fact that the earth temperature will change little throughout the year, that is, from season to season, a system that is called a passive solar system is proposed, and is currently available in different types. This system is actually installed in structures such as houses. Typically, the passive solar system is designed to control the temperature of the air in the space within the house by allowing the air to circulate after it touches the earth. The system is based on the concept of exchanging heat. The air may become warmer or cooler by exchanging its heat with the heat stored in the earth (herein after referred to as the stored heat), and may then be circulated through the interior of the house. As such, the system has a problem in its thermal efficiency.

As an alternative to the passive solar system, another system is proposed which is designed to make a direct use of the stored heat and convey the stored heat to the flooring directly without the medium of the air. To convey the stored heat to the flooring directly, it is necessary to provide a thermal connection between the earth and flooring. Particularly in post-type flooring, where intermediate free space is provided between the earth and flooring to allow air to circulate, this thermal connection will become useless. In order to address this problem, another technique has been proposed. In this technique, a gravel bed is provided on the earth under the floor, and concrete is placed on the gravel bed on which the underfloor concrete layer is formed. Then, the flooring finish boards or slabs are directly applied upon the upper surface of the underfloor concrete layer. This technique is known as the "gravel bed air-conditioning system", which was proposed by the Japanese architect, Kanao Sakamoto (page 24, the Nihon Keizai Shinbun issued on Jan. 30, 1980 and page 15, the Mainichi Shinbun issued on Feb. 22, 1980).

Typically, in conventional structures such as houses, the floor is built by placing a groundsill, or simply sill, on its corresponding continuous footing, also referred to as wall footing or column footing, which is usually made of reinforced concrete. Generally, the groundsill is provided for supporting the columns or posts that are mounted upright thereon, and each groundsill is provided on the location of each corresponding one of the compartments or rooms to delimit the adjacent compartments or rooms from each other. Generally, a continuous footing includes an outer circumferential continuous footing that surrounds the outside of the structure, and an inner continuous footing that is installed inside the outer circumferential continuous footing. The outer and inner continuous footings, each of which corresponds to each groundsill, are provided separately.

In the conventional technique described above, errors may be introduced when the flooring finish boards or slabs are directly applied upon the upper surface of the underfloor concrete layer. Thus, the errors that are allowed for when the flooring finish boards or slabs are applied on the upper surface of the underfloor concrete layer must be kept as minimal as possible. When an ordinary plaster trowel, long bar or plate is used to flatten the upper surface of the underfloor concrete layer, it may cause errors that are on the order of 1 to 10 mm. In order to finish the underfloor concrete layer so that it can have horizontal surface uniformity over a wide area, complicated steps are involved, which may have an unfavorable effect on the working efficiency. This is the case particularly in recent years when specialized or experienced engineers have not been available. Alternatively, mortar may be applied upon the upper surface of the underfloor concrete layer after the concrete becomes hardened, and the thickness of the applied mortar coating may then be adjusted to provide the horizontal surface uniformity. When this operation takes place, it may introduce further errors that must be corrected. Thus, this must be carried out with extreme care.

The earth may be warmed when its surrounding ground level or surface is warmed by being exposed to sunlight and the like, which may also make the earth under the floor warm. In addition, the underfloor concrete layer may also be warmed by the thermal energy that is produced within the house. The heat stored in the earth, coupled with the heat stored in the underfloor concrete layer, may also warm the gravel bed under the underfloor concrete layer. The inventor of the current application conducted experiments, and observed that the stored heat in the gravel bed would be the result of the combined action of "the thin air layer that is present among the adjacent gravel stones", "the gravel stones themselves" and "the underfloor concrete layer", rather than the heat stored in the gravel stones themselves. It was also observed that the gravel layer within the closed space includes a lower layer located nearer to the ground level where the gravel stones still contain a slight amount of water, and in upper layer located farther from the ground level where the gravel stones are in a dry or non-water condition.

In the conventional technique, each continuous footing, which is usually constructed from reinforced concrete, is built for each corresponding groundsill that is being built thereon. Thus, each concrete form or mold must be built for each corresponding continuous footing so that each of the concrete forms can conform to each corresponding one of the continuous footings. The building and subsequent removing of the concrete forms, as well as the arranging of the reinforcing bars, must be carried out for each continuous footing. Those steps must be performed for each individual continuous footing being built, and therefore would require laborious and time-consuming operations. Particularly, when a structure being built, such as a house, has a number of small rooms inside that are delimited by walls from each other, each groundsill must be provided for each room, and each continuous footing must be provided for each corresponding groundsill.

The inventor of the current application has a prior Japanese patent application, which was laid opened to the public inspection under unexamined patent publication No. H10 (1998)—273948A and now patented under No. 3051850. The invention disclosed in this Japanese patent is designed to make effective use of the stored heat in the earth.

The inventor of the present application proposes to provides a further improvement over the prior invention that is disclosed in the above Japanese patent.

SUMMARY OF THE INVENTION

A first object of the present invention is to simplify the process of building the continuous footing, thereby improving the work efficiency. This object may be achieved by providing a continuous footing on a location that corresponds to the location of an outer circumferential groundsill being built that surrounds the outer circumference of a structure such as a house, and providing an inside groundsill integrally constructed with an underfloor concrete layer by burying the inside groundsill within the underfloor concrete layer. A part of the underfloor concrete layer at which the inside groundsill is buried has a projection extending downwardly from the underfloor concrete layer at a location that corresponds to a location of the inside groundsill being built. The inside groundsill is thereby built integrally with the projection of the underfloor concrete layer so that the inside groundsill can provide the desired mechanical strength and stability.

A second object of the present invention is to improve the working precision with which the flooring finish boards or slabs can be placed on the underfloor concrete layer. This object may be achieved by providing the outer circumferential groundsill and inside groundsill such that they can have respective upper edges flush with each other, providing an underfloor concrete layer by placing concrete on the planned location of the floor being built, and flattening the upper surface of the resulting underfloor concrete layer so that it can have horizontal surface uniformity, thereby facilitating the placement of the flooring finish boards or slabs on the underfloor concrete layer.

A third object of the present invention is to improve the working precision with which columns or posts can be mounted upright on the groundsills. This object may be achieved by providing column or post mounting means at the axial center of the upper surface of the inside groundsill, and using the lateral edges of the inside groundsill to flatten the upper surface of the underfloor concrete layer.

Briefly, all of the above objects may be attained by providing an inside groundsill inside the outer circumferential groundsill so that it can have its upper edge flush with that of the outer circumferential groundsill, and placing concrete for forming an underfloor concrete layer along the respective upper edges of the two groundsills.

One aspect of the present invention is to provide a method for building a floor wherein the floor is designed to make a direct use of the stored heat in the earth or the like. The method comprises:

(1) providing a continuous footing made of concrete on a location corresponding to a location of an outside groundsill surrounding the outer circumference of a structure being built, placing stones to cover all of the area on the planned floor location in such a manner that grooves or trenches may be formed along the location of an inside groundsill being built, and installing an outer circumferential groundsill on the continuous footing;

(2) providing an inside groundsill along the location of the same inside groundsill being built so that it can extend across the outer circumferential groundsill and can have its upper edge flush with that of the outer circumferential groundsill;

(3) providing an underfloor concrete layer by placing concrete along the respective upper edges of the outer and inside groundsills within the planned floor location; and (4) after the underfloor concrete placed in step (3) becomes hardened, placing flooring finish boards or slabs on the upper surface of the underfloor concrete layer.

A second aspect of the present invention is to provide a method for building a floor, wherein the floor is designed to make a direct use of the stored heat in the earth or the like. The method comprises: providing a ruler across or between the groundsills so that the ruler can delimit the planned floor location and can be aligned with the respective upper surfaces of the groundsills, and using the upper surfaces of the groundsill and the ruler as a reference to flatten the upper surface of the underfloor concrete layer.

A third aspect of the present invention is to provide a method for building a floor, wherein the floor is designed to make a direct use of the stored heat in the earth or the like. The method comprises:

(1) providing a continuous footing made of concrete, placing stones to cover all of the area on the planned floor location surrounded by the concrete continuous footing, and building a groundsill on the concrete continuous footing;

(2) providing a ruler of any shape steel on the planned floor location so that the ruler can extend between the groundsills opposite each other and have its upper edge flush with that of the respective upper surfaces of the groundsills, the ruler serving as reference for flattening an underfloor concrete that is placed in step (3) below;

(3) placing concrete for forming an underfloor concrete layer along the upper edge of the flattening tool on the planned floor location; and (4) after the underfloor concrete placed in step (3) becomes hardened, placing flooring finish boards or slabs on the upper surface of the underfloor concrete layer.

A fourth aspect of the present invention is to provide a method for building a floor wherein the floor is designed to make a direct use of the stored heat in the earth or the like. The method comprises:

(1) providing column or post mounting means on an inside groundsill; and (2) then, placing the inside groundsill extending across outer circumferential footings.

A fifth aspect of the present invention is to provide a floor construction for a wood structure or house, wherein the floor construction is designed to make a direct use of the stored heat in the earth or the like. An outer circumferential groundsill surrounds the outer circumference of the structure or house being built. An inside groundsill is provided inside the outer circumferential groundsill. An underfloor concrete layer is installed on a stone layer within each of the outer circumferential groundsill and inside groundsill such that the underfloor concrete layer can have its upper surface flush with the respective upper edge of each of the groundsills. Flooring finish boards or slabs are placed on the upper surface of the underfloor concrete layer. The outer circumferential groundsill is built on a continuous footing made of concrete. The inside groundsill is secured at each of opposite ends to the lateral side of the outer circumferential groundsill or to the lateral side of another inside groundsill provided adjacent to the inside groundsill, and is buried within the underfloor concrete layer. A part of the underfloor concrete layer at which the inside groundsill is buried has a projection extending downwardly from the underfloor concrete layer.

A sixth aspect of the present invention is to provide a floor construction for a wood structure or house, wherein the floor construction is designed to make a direct use of the stored heat in the earth or the like. Column or post mounting means is previously provided at an axial center of the upper surface of the inside groundsill.

In each of the aspects of the present invention described above, the outer circumferential groundsill may primarily be made of steel materials such as H-shaped steel, steel pipes, and the like, or wooden materials.

In each of the aspects of the present invention described above, the inside groundsill is provided as an integral part of the underfloor concrete layer so that it can cooperate with the underfloor concrete layer, and may primarily be made of a steel material such as H-shaped steel or steel plate of a rectangular shape.

In each of the aspects of the present invention, the ruler may be provided at any required location across the outer circumferential groundsill, across the inside groundsill, or between the outer circumferential groundsill and inside groundsill.

In each of the aspects of the present invention, the column or post mounting means that is provided at the axial center of the inside groundsill may accept the column or post (mainly tubular column), allowing it to be mounted to the inside groundsill. To this end, the column mounting means may have a projection provided at the axial center and upper surface of inside groundsill for engaging the column or post, and the column or post may have a hole at the bottom surface to engage onto the projection. Alternatively, the column mounting means may include a cylindrical member for accepting the column or post, or may have a bolt hole or round hole for securing the column or post to the inside groundsill.

In each of the aspects of the present invention, the column or post mounting means is usually provided at the axial center and upper surface of the inside groundsill in the factory, and means for fine-adjusting the position or additional mounting means (mainly bolt holes or round holes) may be provided in the field.

In each of the aspects of the present invention, the stored heat in the earth or the like should be understood to mean the stored heat produced by the combined action of the stored heat in the earth, the heat of the gravel stones themselves, the heat carried by the air layer between the gravel stones, and the heat produced under the underfloor concrete layer or the flooring finish boards placed on the underfloor concrete layer.

Typically, the present invention may be embodied as follows.

A continuous footing made of concrete may be built on a location that corresponds to the location of a groundsill being built to surround the outer circumference of a structure such as a house. Within the continuous footing, a stone layer may be installed by placing stones to cover all over the area on the planned floor location. The stone layer includes grooves or trenches formed along the location of an inside groundsill being built. The groundsill surrounding the outer circumference of the structure, or outer circumferential ground, may be built on the continuous footing. Then, the inside groundsill may be built along the grooves or trenches to extend across the outer circumferential groundsill, such that the inside groundsill can have its upper edge flush with that of the outer circumferential groundsill. Next, within the planned floor location, concrete may be placed along the respective upper edges of the outside and inside groundsills to form an underfloor concrete layer. After the concrete that has been placed becomes hardened, flooring finish boards or slabs may be placed on the upper surface of the underfloor concrete layer. This may complete the floor that makes direct use of the heat stored (or stored heat) in the earth or the like.

BRIEF DESCRIPTION OF THE DRAWINGS

FIGS. 4(a) and (b) are perspective views illustrating part of the inside groundsill and the ruler in which the ruler is placed on the inside groundsill, wherein FIG. 4(a) represents a band-like ruler, and FIG. 4.(b) represents the groundsill that is made of C-shape steel, for example;

FIGS. 10(a) and (b) show an inside groundsill adapted for use in the embodiment of the present invention, in which FIG. 10(a) represents a partial perspective view, FIGS. 11(a) and (b) illustrate how the tubular column is installed upright on the inside groundsill, with the underfloor layer being not shown, in which FIG. 11(a) represents a side view and FIG. 11(b) represents a front view.

DETAILED DESCRIPTION OF THE INVENTION (1) First Embodiment

Referring to FIGS. 1 through 5, one embodiment of the present invention is described. In this embodiment, an example in which an outer circumferential groundsill is made of any suitable steel material is shown and described.

Figure 2:
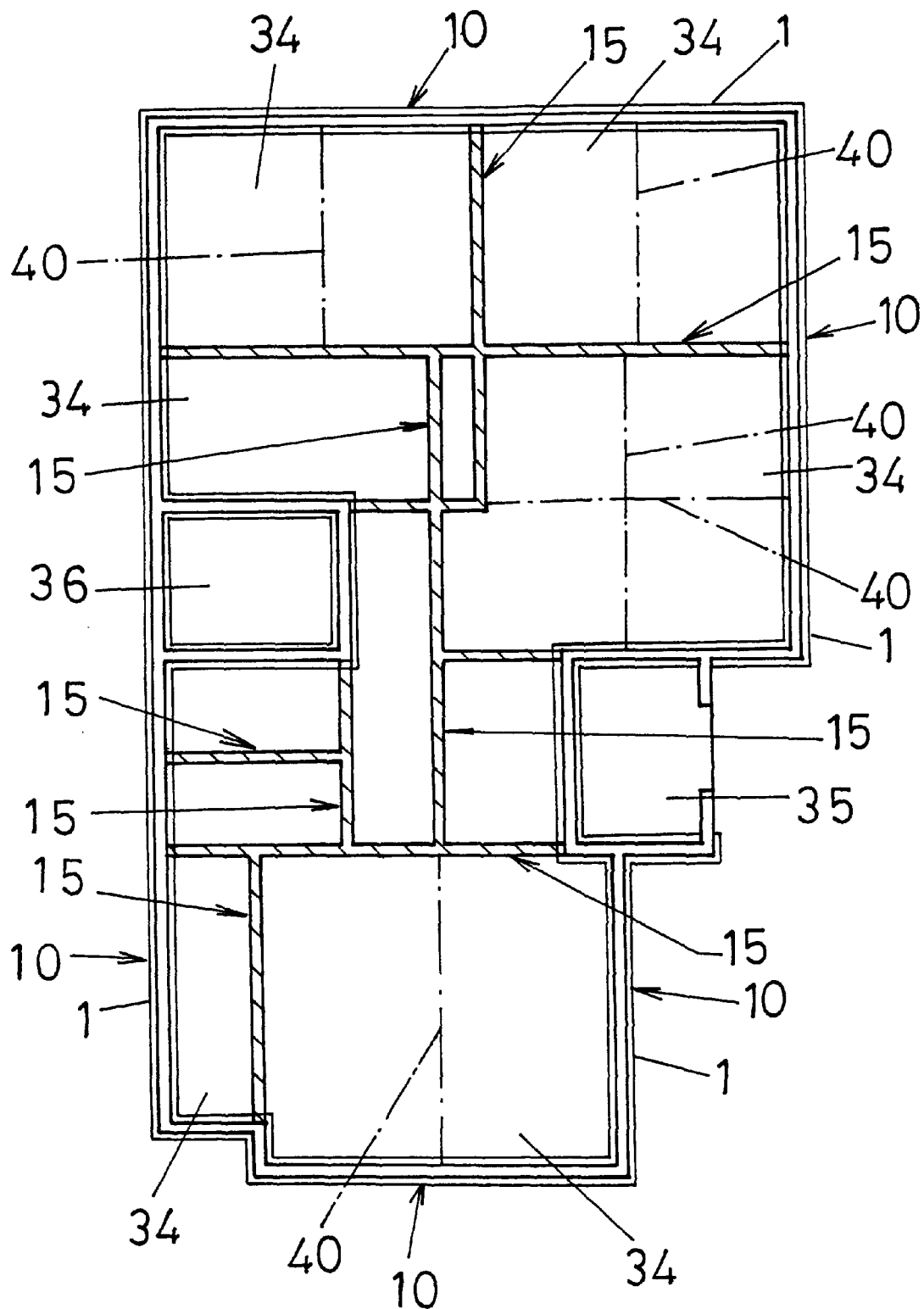
FIG. 2 is a plan view illustrating the layout of groundsills according to one embodiment of the present invention.
Figure 5:
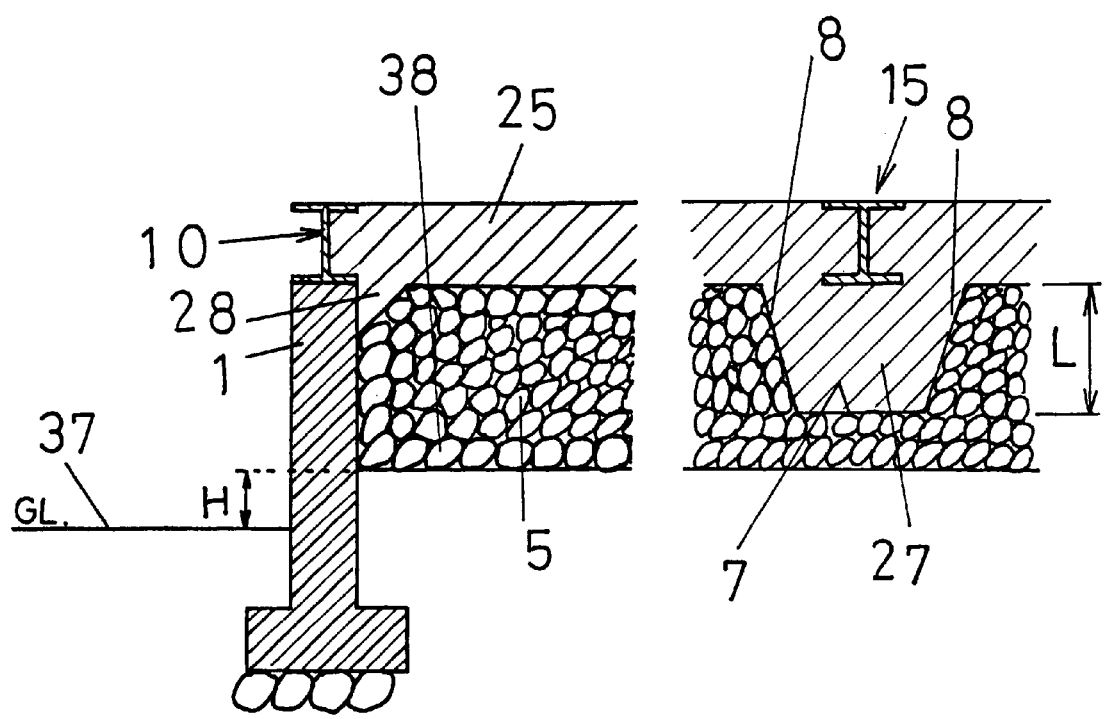
FIG. 5 is a longitudinal sectional view illustrating part of the floor construction.

A continuous footing 1 includes one that may be installed at a location corresponding to the outer circumference of a structure being constructed, one that may be installed at a location corresponding to water inlet and outlet piping 36 and an earth floor, and one that may be installed at a location corresponding to an access port (entrance) 35 and an earth floor, and may be built by using any conventional building technique that is known to the art (FIG. 2). In the prior art, it is necessary to take anti-insect (typically, termites) treatment as a preliminary measure on the earth surface (soil) 38 that is located inside each continuous footing 1, 1 and that corresponds to the planned floor location 34. In the present invention, such preliminary anti-insect treatment can be eliminated. The earth surface (soil) 38 that corresponds to the planned floor location 34 may have its ground level raised by a height H with regard to the surrounding ground level 37 (FIG. 5). Here, the height H must be 50 mm or more, but may be determined based on, depending on the quality of the earth (soil), the square area of the planned floor location 34 and other considerations.

The planned floor locations 34 located inside the corresponding continuous footings 1 may be covered all over with stones 4 of about 40 mm outer diameter until the stones 4 build up to the upper surface 2 of the respective continuous footings 1. The stones 4 may be obtained by reprocessing the residues that result from burning glass, earthenware, etc. A stone layer 5, which is about 300 mm deep, is thus obtained. The upper surface of the stone layer 5 may be flattened to be horizontal, and grooves or trenches 7 may be formed in the stone layer 5 along the location that corresponds to a groundsill (i.e., an inside groundsill) so that the grooves 7 can extend deep into the stone layer 5 by a depth of L as shown in FIG. 5. The grooves 7 may have a trapezoidal shape with lateral sides 8, 8 inclined (FIG. 5). The depth L of the groove 7 may be determined depending upon the quality of the soil, such as the soil's resistance to pressure. The shape of the groove 7 may also be determined as appropriate. Specifically, the groove 7 may have any shape in cross section such as square, rectangular, reversed triangle, semi-circle and the like.

Also, the stone layer 5 is formed so that the portion adjacent to the continuous footing 1 can be lower as shown in FIG. 5.

The stone layer 5 may have a coating of any synthetic resin (such as polyethylene) film 23 of about 0.1 mm thick on the upper surface 5 thereof. The grooves 7 and the other grooves formed adjacent to the continuous footing 1 also have a coating of synthetic resin film 23 along the shape of the upper surface.

An outer circumferential groundsill 10 made of H-shaped steel having upper and lower flanges 11, 12 and web 13 may be placed on the corresponding continuous footing 1. The continuous footing 1 has anchor bolts (not shown) previously embedded therein, and the lower flange 12 (or the upper and lower flanges 11, 12) of the outer circumferential groundsill 10 has through holes that accept the corresponding anchor bolts. The continuous footing 1 and outer circumferential groundsill 10 may be joined together by passing the anchor bolts through the through holes and tightening the anchor bolts by means of nuts.

An inside groundsill 15 is made of H-shaped steel having upper and lower flanges 16, 17 and a web 18, and an end plate 20 secured to each of the opposite ends. Each of the end plates 20 has connecting bolt holes 21. The web 18 may have through holes 22 through which reinforcing bars may be passed (FIG. 3(*a*)).

The upper flange 16 of the inside groundsill 15 may have through holes that are previously provided on the locations where columns or posts are to be mounted. The upper flange 16 may also have bolt 66 at the axial center of it and extending upwardly from the bottom surface thereof, and the bolt 66 may previously be tightened by means of respective nuts 67.

Figure 10A:
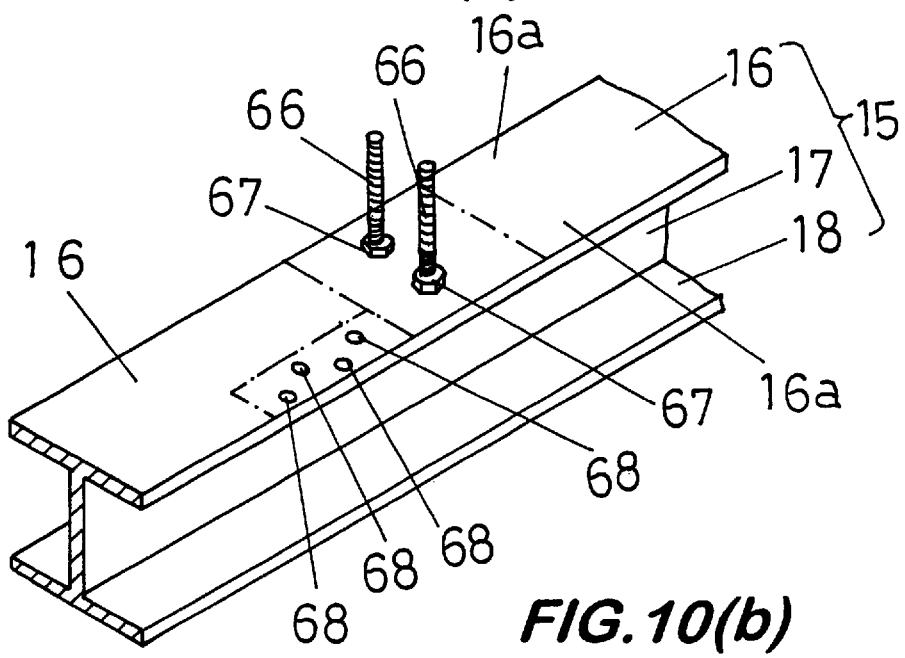
Figure 10B:
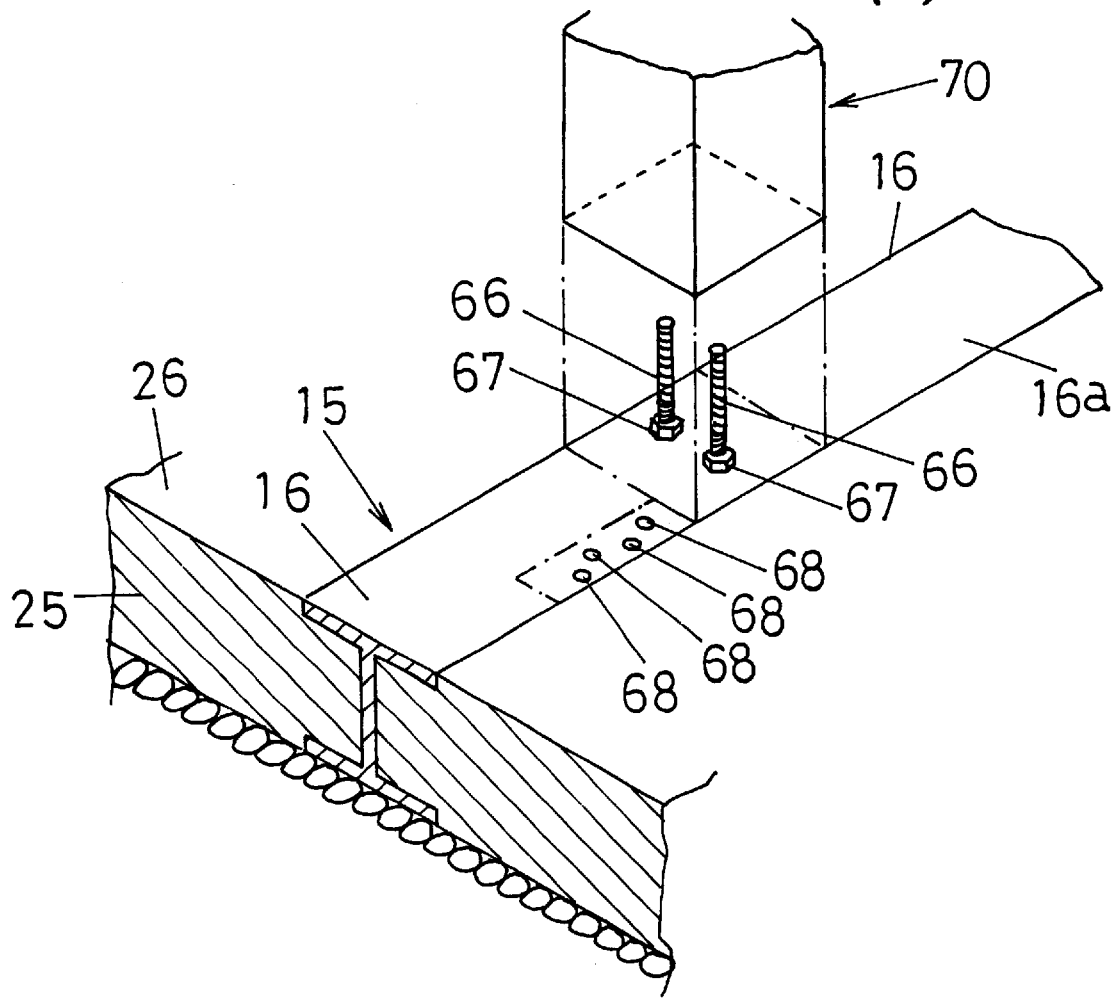
FIG. 10(b) represents a partial perspective view of the floor that has been completed.

A column 70 is mounted on the inside groundsill 15 by bolts 66 as shown in FIG. 10(*b*). That is to say, the inside groundsill 15 has a column or post mounting means comprising bolt 66 and nut 67 at the axial center of its upper surface. When diagonal bracing fixtures are used, the upper flange 16 may previously have through holes 68, 68 that allow the corresponding diagonal bracing fixtures to be fixed, respectively (FIG. 10(*a*)).

The inside groundsill 15 may be built on the location where it is to be built, that is, along the grooves 7 so that it can be placed across the outer circumferential groundsill 10. The inside groundsill 15 may be secured to the outer circumferential groundsill 10 by passing bolts through the bolt holes 21 on the end plates 20 and through the bolt holes 14 on the web 13, and then tightening the bolts by means of the nuts. In this way, the upper flange 16 on the inside groundsill 15 may be aligned with the upper surface of the upper flange 11 on the outer circumferential groundsill 10 (FIGS. 3(*a*) and 3(*b*)).

Next, reinforcing bars 24 may be arranged so that they can extend across the inside groundsills 15. If necessary, the reinforcing bars 24 may be passed through the through holes 22 on the inside groundsill 15.

If necessary, reinforcing bars formed like a cage, or any other reinforcing bars (not shown), may be arranged in the groove 7 below the inside groundsill 15 so that the concrete placed in the groove 7 and the inside groundsill 15 can be combined together.

Then, concrete may be placed on the upper surface of the stone layer 5 (or if present, on the upper surface of the resin film 23) located inside the outer circumferential groundsill 10 (that is, inside the planned floor location) so that an underfloor concrete layer 25 of about 100 mm to 150 mm thick may be provided. During this step, a straight bar (or possibly a plate not shown) may be placed on the upper edge of the groundsill 10, 15 so that it can extend across the groundsills, and the bar may be moved by sliding along the groundsills 10, 15 so that the portion of the concrete 25 that is still unhardened on the surface may be removed and flattened to be horizontal. This flattening work may be carried out for each compartment delimited by the inside groundsill 15 and outer circumferential groundsill 10. In this way, a shorter bar may be used to flatten the concrete on several compartments at a time. Thus, the working may be simplified, and the working efficiency may be increased. The working precision may also be increased so that the surface of the resulting concrete layer 25 can be finished within a tolerance of ±1 mm.

After the underfloor concrete has become hardened, the underfloor concrete layer 25 is obtained, which includes a projection 27 (FIG. 5) that is formed to extend downwardly into the groove 7, integrally with the outer circumferential groundsill 10 and inside groundsill 15. It is noted that the portion of the stone layer 5 that is adjacent to the continuous footing 1 is located lower than the continuous footing 1 as shown in FIG. 5, and therefore the bottom surface of the underfloor concrete layer 25 further has a peripheral projection 28 integrally with the outer circumferential groundsill 10 and inside groundsill 15 along the continuous footing 1 that allows the underfloor concrete layer 25 to settle stably on the stone layer 5.

Figure 1:
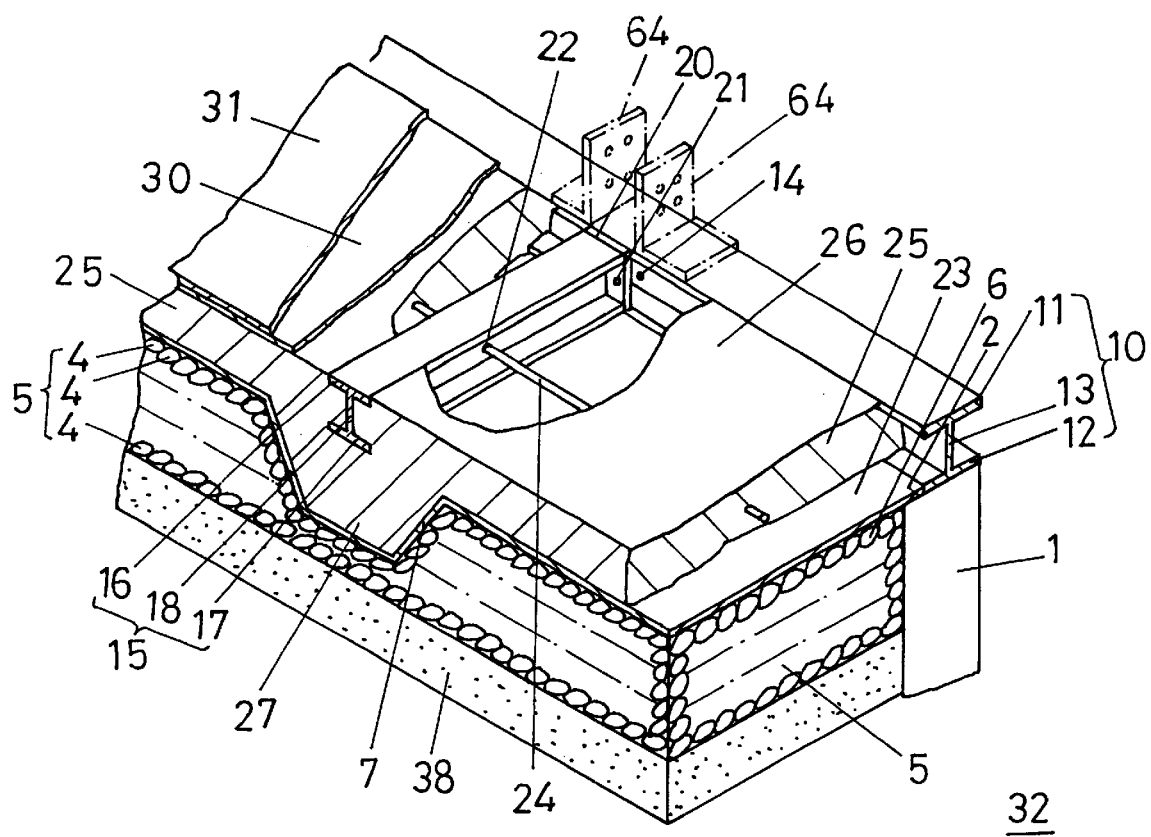
FIG. 1 is a perspective view illustrating a floor construction according to one embodiment of the present invention, with some parts being broken away and some parts being omitted.

When it is determined that the underfloor concrete layer 25 has been dewatered completely, flooring finish boards or slabs 31 may be placed on the upper surface 26 of the underfloor concrete layer 25. If required, underfloor veneer plates 30 may be interposed between the underfloor concrete layer 25 and flooring finish boards 31. Thus, the floor 32 is completed (FIGS. 1 and 2).

Figure 11A:
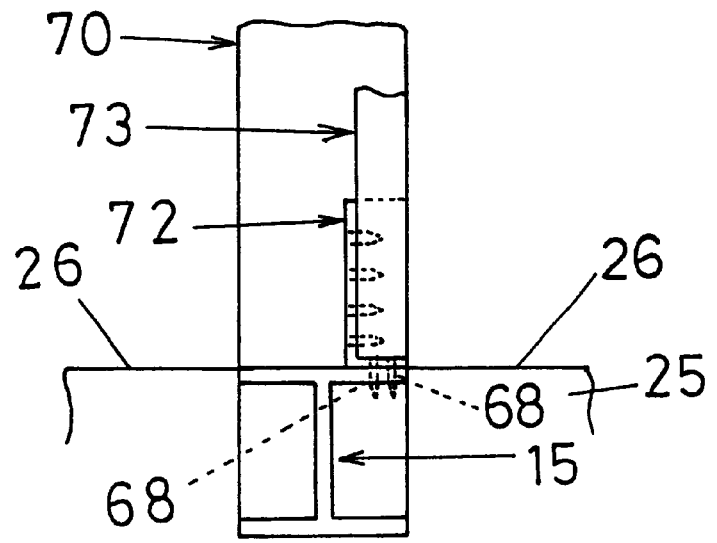
Figure 11B:
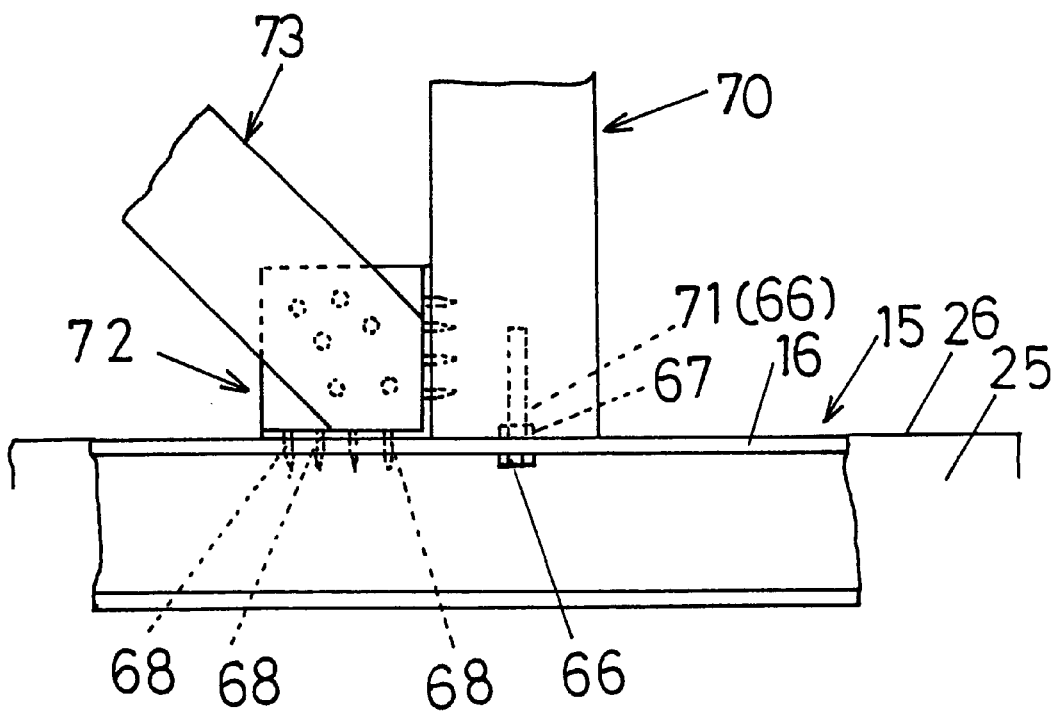

The inside groundsill 15 on which columns or posts (typically, tubular columns) are mounted upright includes screws 66 and nuts 67 that are previously provided, and each of the columns 70 has a hole (mortice) 71 on the bottom end thereof that engages the corresponding screw 66. The column 70 may be secured to the inside groundsill 15 by engaging the screw 66 with the hole 71 (FIG. 1(*b*)). Then a diagonal bracing fixture 72 may be secured to the corresponding through holes 68 on the upper flange 16 by means of screws and then to the column 70. A diagonal bracing 73 may be fixed to the diagonal bracing fixture 72 (FIG. 11(*a*) and (*b*)). As the inside groundsill 15 has previously been worked so that the whole inside groundsill 15, except for the upper flange 16, can be buried in the underfloor concrete layer 25, the column 70 can be secured to the inside groundsill 15 with ease. As the upper flange 16 has no projection on the edges 16*a*, 16*a* (FIG. 10(*a*)), the placement of the underfloor concrete 25 as well as the subsequent flattening of the upper surface 26 can be performed without being prevented by such projections.

The floor 32 that has thus been constructed has a construction that allows a column or post made of wood or steel to be installed upright on the groundsill (typically, the outer circumferential groundsill) 10 as it is done in the conventional art (not shown). For example, when a wood column or post is installed upright on the steel groundsill 10, the groundsill 10 may have a metal fixture 64 welded thereto for supporting the column (or it may be previously welded at the factory), and the column may be secured to the metal fixture 64 by means of a bolt, pin, or nail (as shown by the dashed lines in FIG. 1). The column supporting metal fixture 64 may be provided on the groundsill 10 either in the field or at the factory by using bolts or the like. A steel pipe may be welded to the groundsill 10 so that it can receive the column (not shown).

It should be noted that the inside groundsill 15, which has been worked as described above in connection with FIG. 10(*a*), may also be worked in the same manner as described above for the outer circumferential groundsill 10.

As the continuous footing 1 that is provided for constructing the floor 32 in accordance with this embodiment only corresponds to the location of the outer circumference of the structure and to the location of the water inlet and outlet piping, there is no need of providing another continuous footing 1 inside, and thus the labor and cost required to do this can be eliminated.

As the inside groundsill 15 may be combined with the projection 27 extending downwardly from the underfloor concrete layer 25, and may be placed on the stone layer 5, the portion of the inside groundsill 15 combined with the projection 27 can have a mechanical strength that is equivalent to that of the inside continuous footing that would otherwise be provided. Then the column may be installed on the inside groundsill 15.

As the inside groundsill 15, which is made of H-shaped steel, is combined with the underfloor concrete layer 25 and stone layer 5 located below the inside groundsill 15, it can resist any loads transmitted from the column supported by the inside groundsill 15, such that the upper flange 16 can resist the sinking force, and the lower flange 17 can resist the floating force. Thus, the structure thus constructed can have great mechanical strength as compared with the structure according to the prior art.

The floor 32 constructed in accordance with this embodiment includes the flooring finish boards 31 that are directly placed on the underfloor concrete layer 25 and stone layer 5 below it, and the surface of the floor 32 can have a greater tolerance range against any loads applied thereto. Thus, the floor can support heavy loads, such as a piano, furniture and the like, without providing for any special measures that augment the floor mechanically.

In this embodiment, as no wood is used below the floor, no particular precautions, such as a preliminary anticorrosive, anti-insect (typically, termites) treatment and the like, are required. Thus, the whole structure including the floor 32, can have a longer lifetime.

The floor 32 constructed in accordance with this embodiment is thermally connected to the earth under it. In winter, the thermal energy stored in the earth may be transmitted to the interior of the house through the stone layer 5 and underfloor concrete layer 25, and in summer, the thermal energy produced inside the house may be absorbed by the underfloor concrete layer 25 and stone layer 5. Although the situation may depend on the particular geographical region where the structure is installed, the stone layer 5 may generally be kept at a maximum temperature of 24° C. (in summer) and at a minimum temperature of 12° C. (in winter), and the temperature may be transmitted from the stone layer 5 directly to the flooring finish boards 31 where the temperature may be maintained to below 25° C. in the summer season and may be maintained to above 10° C. in the winter season.

Any moisture contained in the earth may be dried by the surface of the stones on the stone layer 5, and will never extend to the flooring finish boards 31.

As the stored heat in the earth can be utilized directly, comfortable housing conditions can be ensured, regardless of the environmental or geographical conditions in which the structure is located, such as whether the structure is situated under the shining sun, the particular geographical conditions under which the structure is located, etc.

As the stone layer 5 is provided under the floor 32 constructed in accordance with this embodiment, and the stone layer 5 contains stones 4 that have some fluidity, any external vibrations or noises produced by earthquake or vehicles may be absorbed by the stone layer 5. The structure cannot be influenced by those external vibrations or noises. Furthermore, any vibrations or noises produced inside the structure may also be absorbed by the stone layer 5.

The stones 4, as referred hereinbefore to as the "stones that may be obtained by reprocessing the residues that result from burning glass, earthenware, etc.", should be understood to include the cullet that may be obtained by removing any valuable substances such as metals from the residues that result from burning glass, earthenware, etc., crushing the remainder including the glass, earthenware, etc., and polishing the resulting aggregates (such as the one manufactured and offered by Ozawa Concrete Industry Co., Japan). The stones 4 may also include recycled materials that may be obtained by reprocessing wastes. Using stones thus obtained may eliminate the need of consuming the gravel that is a precious natural resource, and may also contribute to increasing the stored heat efficiency and mechanical floor strength. Using those stones has the advantage in that the wastes can be recycled for re-use, and the working efficiency can be increased because they are light in weight.

In the embodiment described so far, the inside groundsill 15 and outer circumferential groundsill 10 are joined by using the end plates 20. This may be performed by any other joining means. For instance, the outer circumferential groundsill 10 may be equipped with a joining metal device 49 formed like an L shape in plane. One member 49*a* may previously be welded to the web 13 on the outer circumferential groundsill 10 and the other member 49*b* may engage the corresponding web 17 on the inside groundsill 15. In this case, the other member 49*b* of the joining metal device 49 may have mounting through holes 50 (FIG. 3(*b*)). The web 18 on the inside groundsill may have through holes that register with the through holes on the other member (not shown).

In the embodiment described so far, the inside groundsill 15 and outer circumferential groundsill 10 are joined by using the bolt-nut combination, but may be joined by welding (not shown).

In the embodiment described so far, the inside groundsill 15 is made of H-shaped steel, but may be made of any other shaped steel, provided that the inside groundsill may be formed as an integral part of the underfloor concrete layer 25 with its upper edge being flush with the upper edge of the underfloor concrete layer 25. For example, L-shaped steel or C-shaped steel or a combination of both, or steel pipes, may be used (not shown).

Figure 4A:
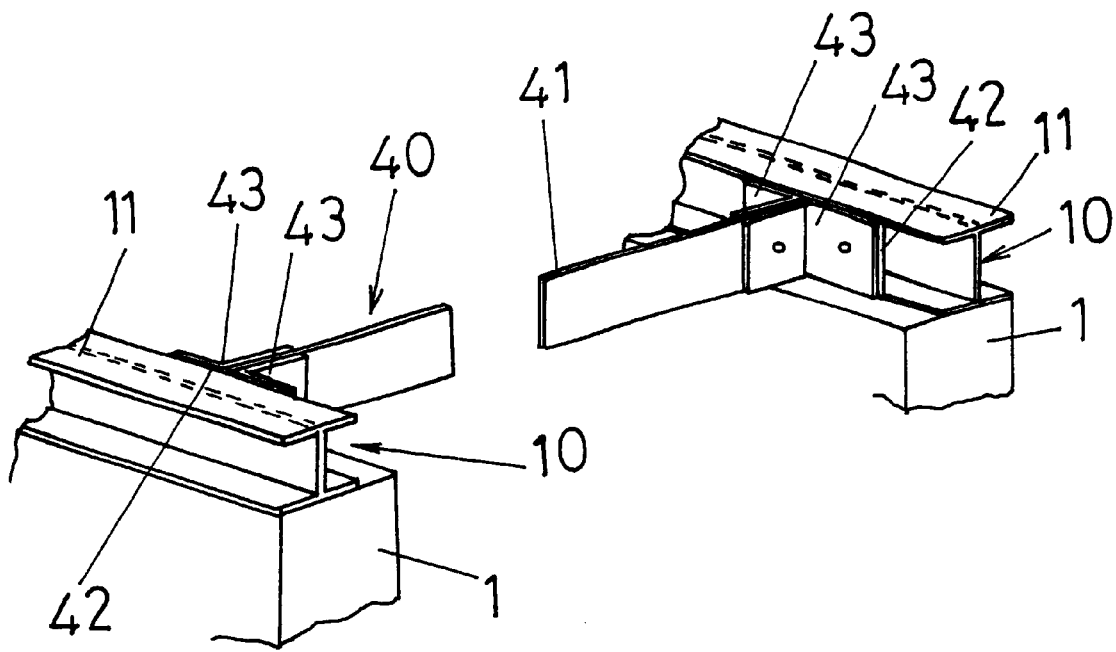
Figure 4B:
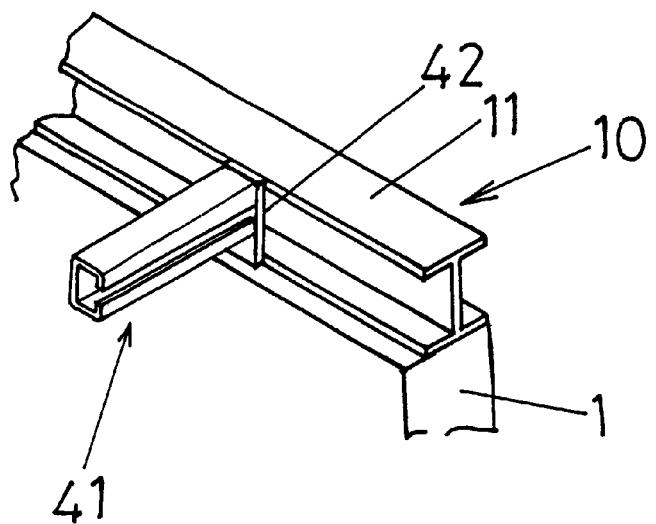

As a variation of the embodiment described so far, where the planned floor location 34 has a larger square area, a ruler 40 may be placed between the outer circumferential groundsill 10 and inside groundsill 15, extending across the areas of the outer circumferential groundsill 10, and the inside groundsill 15, in order to permit the planned floor location 34 to be divided into several sections (ruler 40 is shown by the dashed lines in FIG. 2, and in FIG. 4(a)). In this way, the flattening operation for the underfloor concrete 25 will be easier as it can be performed for each section.

For example, the ruler 40 may be made of a band-like steel plate, and each of the outer circumferential groundsill 10 and inside groundsill 15 may have a back-up plate 42 previously welded thereto. A pair of L-letter metal devices 43 may be fixed to the back-up plate 42 by the bolt-nut combination so that the ruler 40 can be accepted by the pair of L-letter metal devices 43. Then, the ruler 40 may be secured to the metal devices 43 by the bolt-nut combination, with each of the opposite ends being held by each respective pair of the metal devices 43 (FIG. 4(a)). In this case, when the ruler 40 is mounted, its height may be adjusted so that the upper edge 41 of the ruler 40 can be placed flush with the upper edge of the outer circumferential groundsill 10. For the inside groundsill 15, the ruler 40 may also be mounted in the same manner. The ruler 40 may be made of any small-size shaped steel, such as C-shaped steel (FIG. 4(b)), H-shaped steel and L-shaped steel, or otherwise a steep pipe (not shown).

In the embodiment described so far, the resin film 23 that is formed on the underfloor concrete 25 may provide a good quality underfloor concrete layer 25, as it serves to prevent any water contained in the still unhardened portion of the placed concrete 25 from entering into the stone layer 5 below it, thereby preventing the water from being withdrawn from the concrete 25. The resin film 23 may have a thickness of about 0.1 mm. It should be understood, however, that the present invention is not restricted to this particular thickness. The thickness may be determined depending upon the particular needs. The resin film 23 may include polyethylene or any other resins.

In the embodiment described so far, the flooring finish boards 31 are used. The flooring finish boards may be replaced by any other known finish boards, such as cork, flooring sheets of various resins, Japanese tatami or mat, and the like. If not required, the veneer plate 30 below the flooring finish boards 31 may be omitted.

In the embodiment described so far, the underfloor concrete layer 25 includes reinforcing bars 24 that are buried therein to increase the strength of the concrete, which may be replaced by metal nets (not shown) or may be used together with the metal nets. The reinforcing bars 24 and/or metal nets may be omitted, provided that the underfloor concrete layer 25 could otherwise have the required strength or anti-cracks.

In the embodiment described so far, the stone layer 5 has a thickness of about 200 mm, and the underfloor concrete layer 25 has a thickness of about 100 mm to 150 mm. In either case, the thickness may be determined depending upon the particular requirements for the continuous footing 1, outer circumferential groundsill 10 and inside groundsill 15. Specifically, the stone layer 5 may usually have a thickness between 50 mm and 600 mm, and the underfloor concrete layer may usually have a thickness between 20 mm and 200 mm, although these values are not limitative.

In the embodiment described so far, the stone layer 5 includes the stones 4, or the cullet, that may be obtained by reprocessing the residues that result from burning wastes, but may include any other materials that provide heat storing capabilities, such as concrete waste, various recycled aggregates, and the like. It is noted, however, that the present invention is not limited to those materials. It is also noted that the stone layer 5 may include any secondary product that may be obtained by mixing gravel or cement together with the fused slag obtained by processing burned ashes, or such secondary product crashed into fine pieces, or resin concrete obtained by mixing various high polymer substances together with the fused slag. The stone layer 5 may also include any one or combinations of any materials, such as gravels, other resins, glasses, earthenware, and rubber, which have the required strength and size.

(2) Second Embodiment

Another embodiment of the present invention is now described by referring to FIGS. 6 through 9. In this embodiment, the outer circumferential groundsill is made of wood as in the prior art.

Like the preceding embodiment described above, a continuous footing 1 that is installed at a location that corresponds to the outer circumference of a structure being constructed, a continuous footing 1 that is installed at a location that corresponds to water inlet and outlet piping 36 and an earth floor, and a continuous footing 1 that is installed at a location that corresponds the access port (entrance) 35 and an earth floor may be built in the same manner as described above in connection with the preceding embodiment. Similarly, the surface of the earth (soil) 38 of the planned floor location 34 that is located inside the continuous footing 1 surrounding the outer circumference of the structure is not required to have preliminary anti-insect (typically, termites) treatment. Then stones 4, each having an outer diameter of about 40 mm, which may be obtained by reprocessing the residues that result from burning wastes, may be placed to cover all of the area on the planned floor location inside the continuous footing 1 until the stones are built up to the upper surface of the continuous footing 1. A stone layer 5 that is about 300 mm thick may thus be formed. Then, a resin film 23 (such as polyethylene), which is about 0.1 mm thick, may be formed on the upper surface 6 of the stone layer 5.

Next, an outer circumferential groundsill 10 that is made of wood and supports the foot of a column or post may be placed on the continuous footing 1. The continuous footing 1 has anchor bolts (not shown) previously embedded therein that are used to secure the outer circumferential groundsill 10 to the continuous footing 1, as is known in the prior art. The outer circumferential groundsill 10 has a lateral through hole 58 on the side thereof on which an inside groundsill 15 is joined with the groundsill 10, and has a portion 59 for accommodating a nut on the outer lateral side opposite the side on which the through hole 58 is located.

Figure 3A:
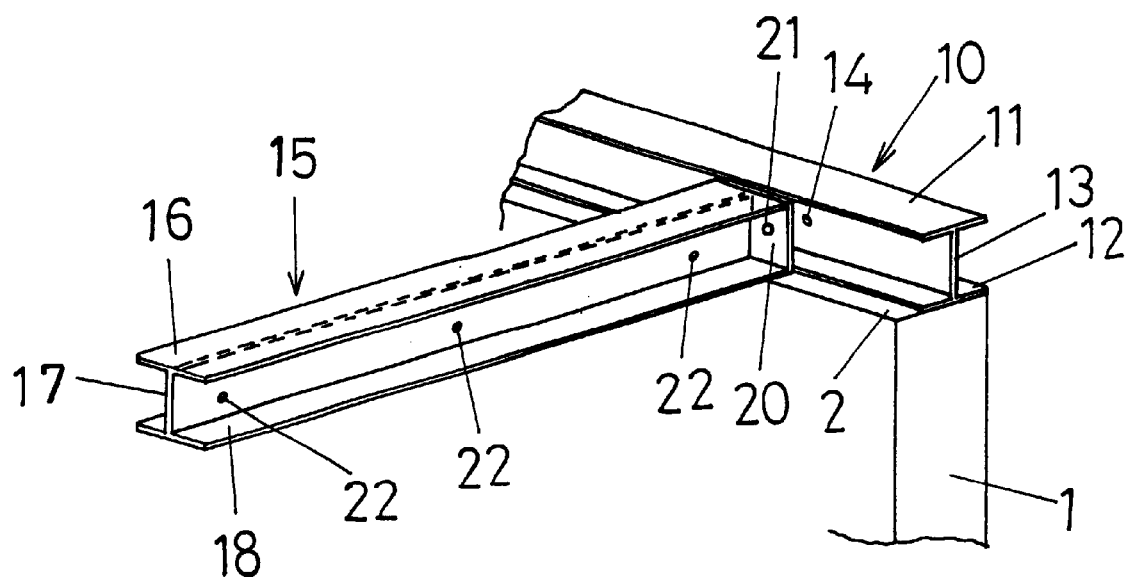
FIG. 3(a) is a perspective view illustrating the portions of the outer circumferential groundsill and corresponding inside groundsill, where they are interconnected according to one embodiment of the present invention.
Figure 3B:
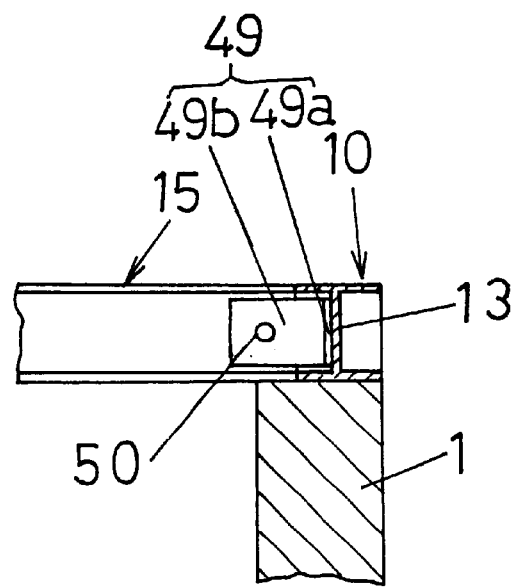
FIG. 3(b) is a longitudinal sectional view illustrating the portions of the outer circumferential groundsill and corresponding inside groundsill, where they are interconnected according to another embodiment of the present invention.
Figure 6:
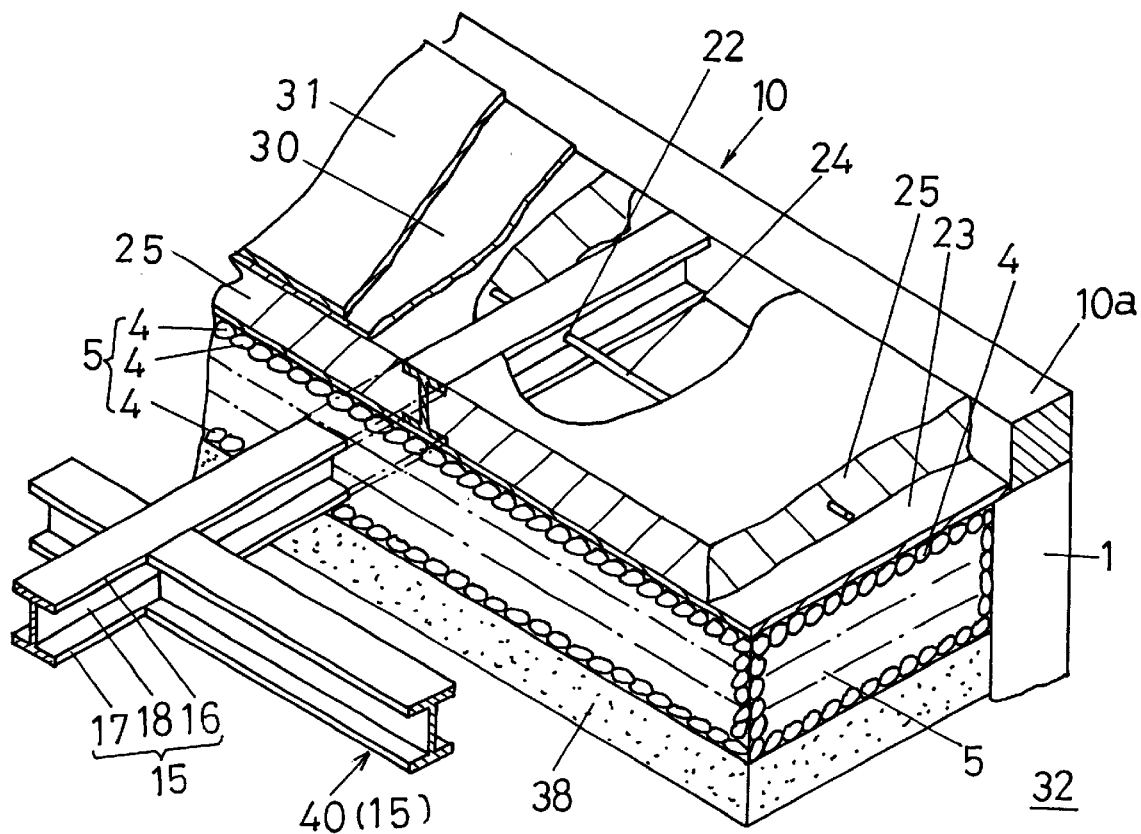
FIG. 6 is a perspective view illustrating the floor construction according to another embodiment of the present invention, with some parts being broken away and some parts being omitted.

The inside groundsill 15 that may be used in this embodiment is now described. The inside groundsill 15 may be made of H-shaped steel having upper and lower flanges 16, 17 and webs 18, as described above in connection with the preceding embodiment. One of the webs 18, which is located on the end on which the inside groundsill 15 is to be joined, has a through hole for accepting a strap bolt, and the other is an intermediate web 18 having through holes 22 for accepting reinforcing bars (FIG. 3 and FIG. 6). On the location of the inside groundsill 15 where a column or post is being mounted upright, similarly to the preceding embodiment, a through hole may previously be provided on the upper flange 16, from which a bolt shaft 66 may extend upwardly, with a nut 67 being mounted on each of its opposite ends. The upper flange 16 may have through holes 68 that permit a respective diagonal bracing metal fixture 72 to be mounted to the upper flange 16 if the diagonal bracing metal fixture 72 is to be mounted (FIG. 10(a)).

The inside groundsill 15 may be installed perpendicular to the outer circumferential groundsill 10 along its planned location. On each of the opposite ends of the inside groundsill 15, where it is to be joined with the outer circumferential groundsill 10, the web 18 on the inside groundsill 15 may have a strap bolt 60, and the outer circumferential groundsill 10 may have a through hole 58, through which a bolt portion 61 of the strap bolt 60 may be inserted and tightened by a nut. The plate portion 61a of the strap bolt 60 may be secured to the web 18 on the inside groundsill 15 by using a bolt-nut combination. In this case, pieces of stone (or a mass of concrete pieces) 62 of an appropriate size, which may be used to adjust the height, may be interposed between the upper surface 2 of the continuous footing 1 and the bottom side of the lower flange 17 on the inside groundsill 15, so that the upper surface 10a of the outer circumferential groundsill 10 can be aligned flush with the upper surface of the upper flange 16 on the inside groundsill 15 (FIG. 7(b)).

In cases where the planned floor location 34 has a larger square area, a ruler 40, which is made from H-shaped steel, may be placed between the outer circumferential groundsill 10 and inside groundsill 15, perpendicular to the outer circumferential groundsill 10 and the inside groundsill 15, so that the planned floor location 34 can be divided into several sections in order to facilitate the flattening operation for the underfloor concrete layer 25 (FIG. 2). The H-shaped steel ruler 40 includes upper flange 51, lower flange 52 and web 53.

To permit the ruler 40 to be joined to the lateral side of the inside groundsill 15, a plate 54 may preliminarily be fixed to the bottom side of the lower flange 17 on the inside groundsill 15 by welding or by means of a bolt-nut combination. The plate 54 has a pair of through holes 55 that engage the corresponding portions of the inside groundsill 15. The ruler 40 has a pair of through holes 56 on each of the opposite ends thereof that register with the corresponding through holes 55 on the lower flange 52 (FIG. 7(a)). Then, the opposite ends of the ruler 40 may be placed on the plate 54 so that each pair of through holes 56 can engage the corresponding pair of through holes 55 on the plate 54, and the ruler 40 may be secured to the plate 40 by means of a bolt-nut combination so that the upper surface of the upper flange 51 on the ruler 40 can be aligned flush with the upper surface of the upper flange 16 on the inside groundsill 15 (FIGS. 7(a) and (b)). If required, the upper flanges 16 and 51 may be joined by welding.

At the point where one inside groundsill 15 and another inside groundsill 15 intersect each other, they may be jointed in the same manner as the inside groundsill 15 and the ruler 40 are joined. The process of joining the ruler 40 with the inside groundsills 15 of H-shaped steel may also be applied to the preceding embodiment.

Reinforcing bars 24 may be arranged across the inside groundsills 15, and if required, may be passed through the through holes 22.

Figure 7A:
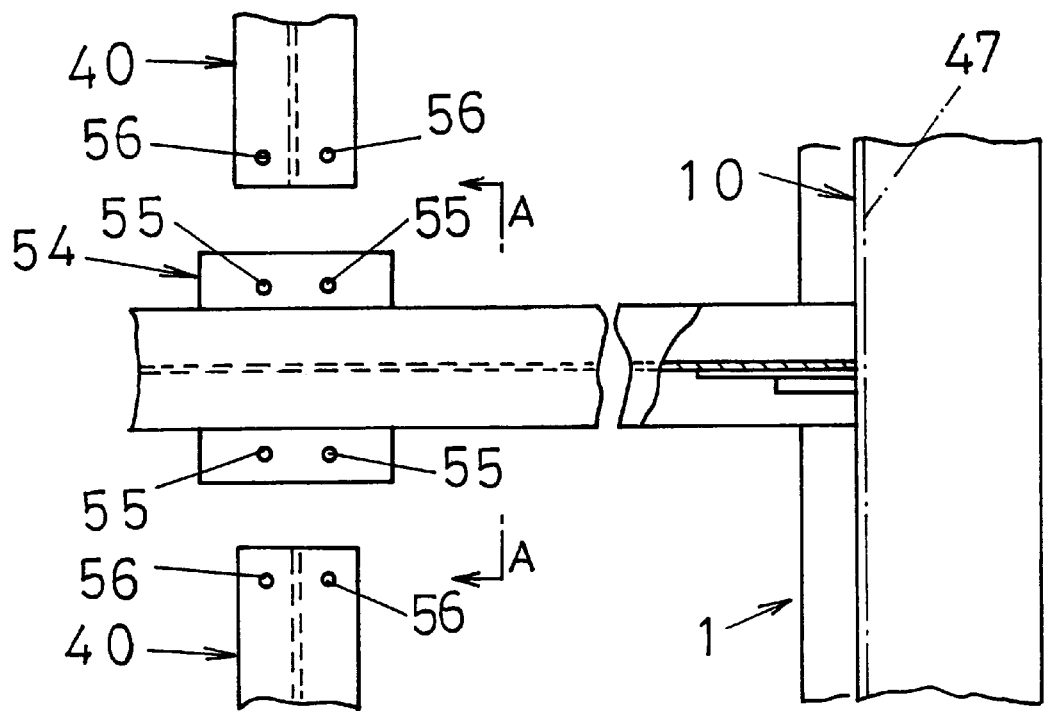
FIG. 7(a) is a plan view illustrating the inside groundsill at the stage in which the inside groundsill is being joined.
Figure 8A:
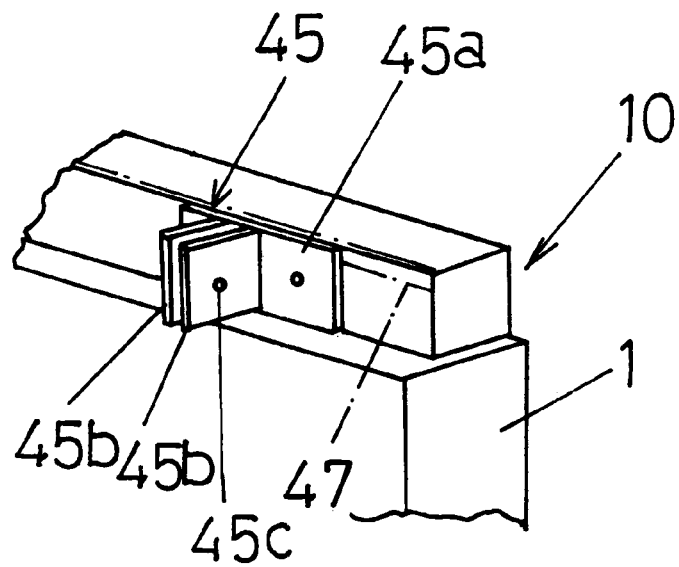
FIGS. 8(a) and (b) are partial perspective views illustrating another inside groundsill to show how the inside groundsill is mounted, in which FIG. 8 (a) represents the stage in which the inside groundsill is not yet joined.
Figure 8B:
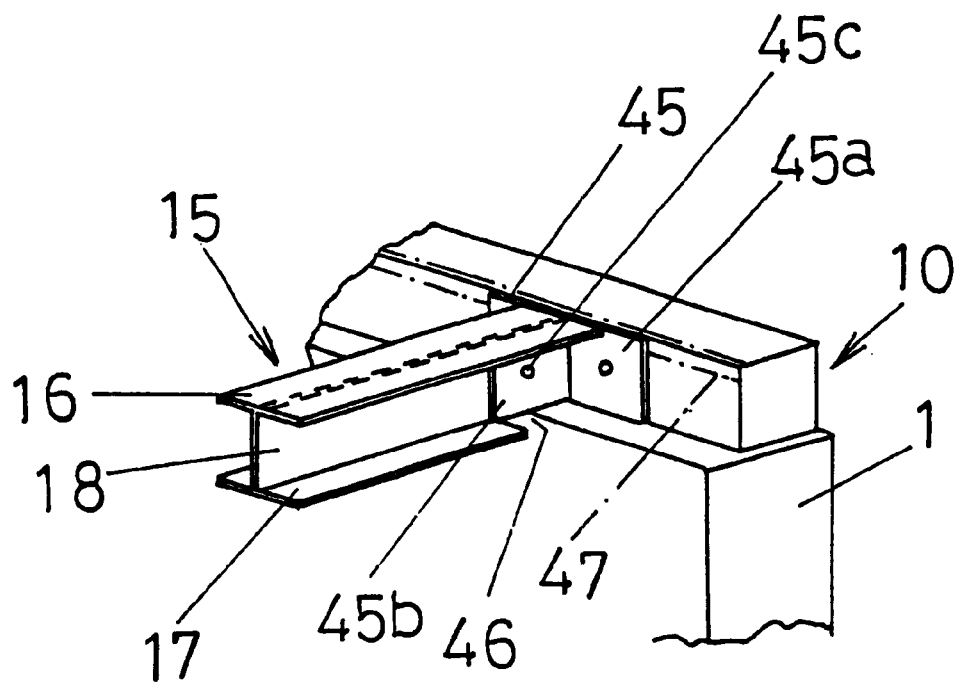
FIG. 8(b) represents the stage in which the inside groundsill has been joined.
Figure 9A:
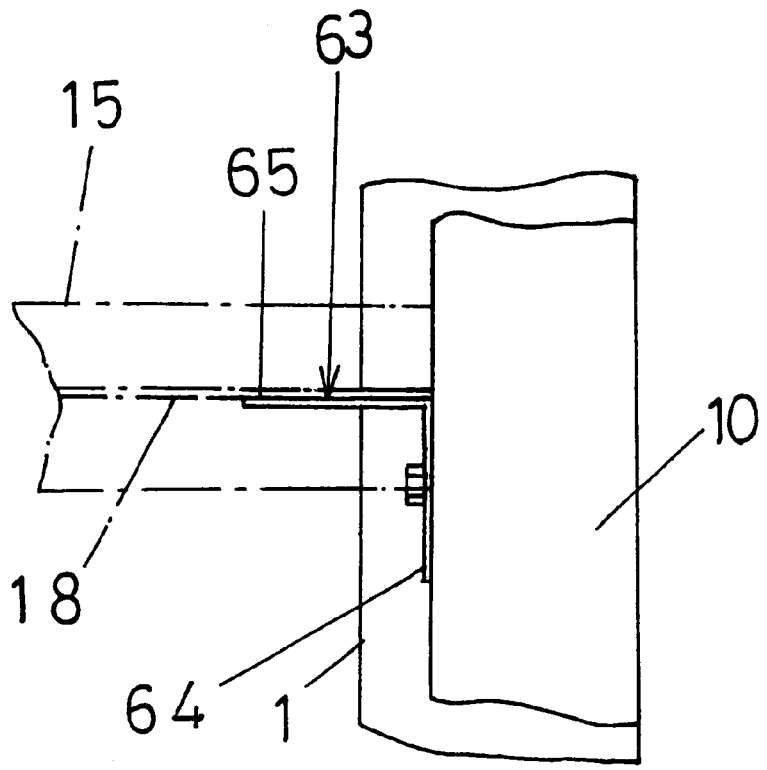
FIGS. 9(a) and(b) are partial perspective views illustrating a further inside groundsill to show how the inside groundsill is mounted, in which FIG. 9 (a) represents a partial plan view.
Figure 9B:
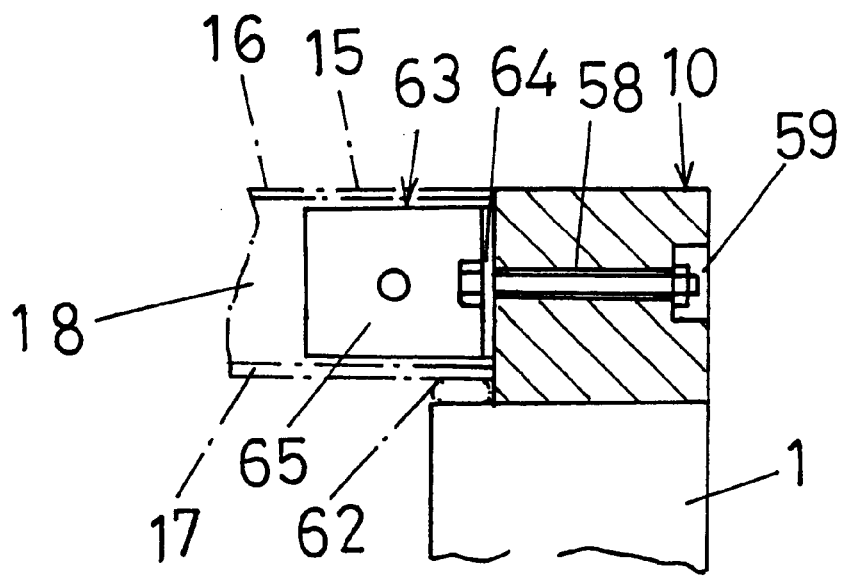
FIG. 9(b) represents a front view with some parts being broken away.

In order to avoid that the outer circumferential groundsill 10 and other parts will become dirty when concrete is placed for forming the underfloor concrete layer 25, if required a curing sheet may be added so that it extends outwardly from the upper surface of the outer circumference groundsill 10 (not shown), and the curing sheet may have its ends temporarily retained by a retainer plate 47 provided on the upper end of the outer circumferential groundsill 10 on its inner lateral side (as shown by the dashed lines 47 in FIG. 7(a) and FIG. 8).

Then, as in the preceding embodiment, concrete may be placed on the upper surface 6 of the stone layer 5 (or on the upper surface of the resin film 23 thereon, if present) within the outer circumferential groundsill 10 (the planned floor location) so that it can form an underfloor concrete layer 25 having a thickness of about 100 mm. Like the preceding embodiment, any portion of the underfloor concrete 25 that remains unhardened on the upper surface may be removed by using a straight bar between the respective upper edges of the groundsills 10, 15 or the ruler 40 so that the upper surface of the underfloor concrete 25 can be flattened uniformly. As the planned floor location is divided into several sections that are delimited by the groundsills 10, 15 or the ruler 40, concrete may be placed for each section that has the smaller square area, and the flattening operation may be performed for each section. Thus, the working efficiency can be increased, and the working precision can be increased. As such, the underfloor concrete layer 5 for each section can be formed within a tolerance of ±1 mm.

Then, after it has been determined that the underfloor concrete layer 25 has been completely dewatered, flooring finish boards 31 may be placed on the upper surface 26 of the underfloor concrete layer 25. In this case, veneer plates 30 may be interposed between the underfloor concrete layer 25 and flooring finish boards 31, if required. Finally, the floor 32 is completed (FIG. 6). The floor 32 thus obtained may provide functional effects that are equivalent to those of the floor according to the preceding embodiment, and the columns or posts may be placed on the floor 32 in the same manner as described in connection with the preceding embodiment.

In the current embodiment being described, the inside groundsill 15 and ruler 40 are joined by using the plate 54. Instead of using the plate 54, they may be joined by any other means, provided that such means can ensure that the underfloor concrete just placed is maintained in its form until it begins to be hardened (not shown).

Figure 7B:
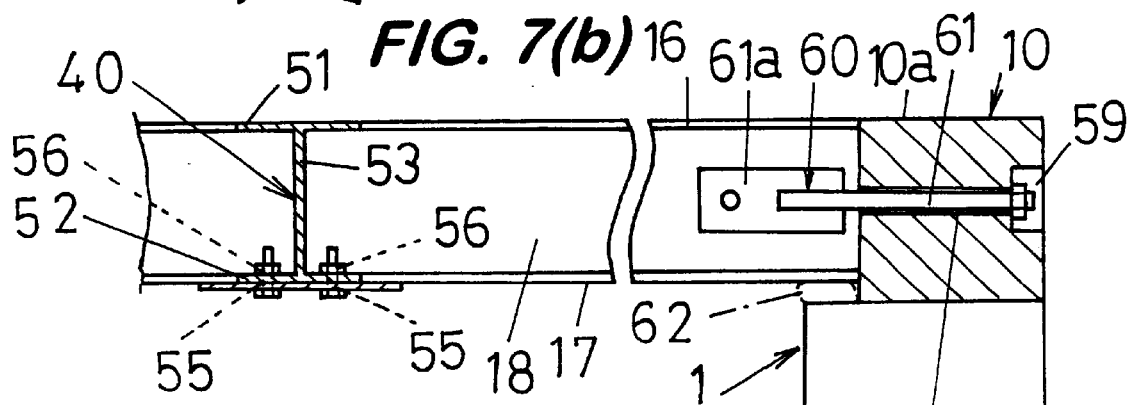
FIG. 7(b) is a plan view illustrating the inside groundsill at the stage in which the inside groundsill has been joined, with some parts being broken away and some parts being omitted.
Figure 7C:
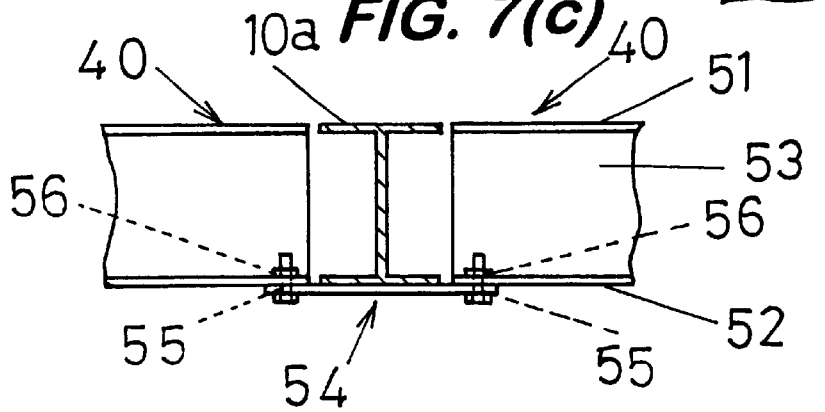
FIG. 7(c) is a sectional view taken along the line A—A in FIG. 7 (a) at the stage in which the inside groundsill has been joined.

In the current embodiment, the outer circumferential groundsill 10 and inside groundsill 15 are joined by using the strap bolt 60 (FIG. 7(b)), but the strap bolt 60 may be replaced by any other means.

For example, the outer circumferential groundsill 10 may have a T-letter metal device 45 for accepting the inside groundsill 15 (FIG. 8(a)), the T-letter metal device 45 having a base 45a secured to the inner lateral side of the outer circumferential groundsill 10. Thus, the outer circumferential groundsill 10 and inside groundsill 15 may be joined by holding the web 18 on the inside groundsill 15 between a pair of parallel members 45b of the T-letter metal device 45 and then tightening the two elements with a bolt-nut combination (FIGS. 8(a) and (b)). In this case, the lower flange 17 on the end of the inside groundsill 15 on which it is joined may have a recess 46 that permits the inside groundsill 15 to be installed from above the metal device 45. The members 45b, 45b of the T-letter metal device 45 may have a through hole 45c through which a bolt is passed, and the inside groundsill may have a through hole that registers with the through hole 45c (not shown).

For example, an L-letter metal device 63 that includes a base 64 and a member 65 projecting from the base 64 may previously be provided on the inner lateral side of the outer circumferential groundsill 10, and the base 64 of the L-letter metal device 63 may have a through hole through which a bolt is passed. The outer circumferential groundsill 10 may have a through hole 58 that registers with the through hole, and the bolt may be passed through the through hole on the base 64 and then though the through hole 58 and may be tightened by the bolt-nut combination (FIGS. 9(*a*) and (*b*)). In this case, the base of the metal device may be placed along the web on the inside groundsill 15, and then may be secured by the bolt-nut combination.

In the current embodiment, trenches or groove 7 may be formed in the stone layer 5, and the underfloor concrete 25 may have a projection 27 extending downwardly therefrom, as described above in connection with the preceding embodiment, although this is not shown.

In the current embodiment, the rule 40 may have similar variations, as described above in connection with the preceding embodiment.

In the current embodiment, the stones 4, the stone layer 5, the underfloor concrete layer 25, the inside groundsill 15, the veneers 30 interposed on the underfloor concrete layer 5, and the column mounting devices may have similar constructions, respectively, as described above in connection with the preceding embodiment.

Although the present invention has been described with reference to the particular embodiments thereof, it should be understood that the present invention should not be limited to those embodiments, but various changes and modifications may be made without departing from the spirit and scope of the invention as defined in the appended claims.

What is claimed is:

1. A method for building a floor, wherein the floor is designed to make a direct use of the heat stored in the earth, and wherein the method comprises the steps of:
    (a) providing a continuous footing made of concrete on a location corresponding to a location of an outside groundsill surrounding an outer circumference of a structure being built, placing stones to cover all over an area on a planned floor location in such a manner that grooves or trenches may be formed along the location of an inside groundsill being built, and installing an outer circumferential groundsill on the continuous footing;
    (b) providing an inside groundsill along a location of the inside groundsill being built so that it can extend across the outer circumferential groundsill and can have its upper edge flush with that of the outer circumferential groundsill;
    (c) providing an underfloor concrete layer by placing concrete along the respective upper edges of the outer and inside groundsills within the planned floor location; and
    (d) after the underfloor concrete placed in step (c) becomes hardened, placing flooring finish boards or slabs on the upper surface of the underfloor concrete layer.

2. The method for building a floor as defined in claim 1, wherein the floor is designed to make a direct use of the stored heat in the earth, and wherein the method comprises:
    providing a ruler across or between the groundsills so that the ruler can delimit the planned floor location and can be aligned with the respective upper surfaces of the groundsills, and using the upper surfaces of the groundsill and the ruler as a reference to flatten the upper surface of the underfloor concrete layer.

3. The method for building a floor as defined in claim 1, wherein the floor is designed to make a direct use of the stored heat in the earth and wherein the method comprises:
    (a) providing column or post mounting means on the inside groundsill; and
    (b) then, placing the inside groundsill extending from the outer circumferential footings.

4. A method for building a floor, wherein the floor is designed to make direct use of the stored heat in the earth, and wherein the method comprises:
    (a) providing a continuous footing made of concrete, placing stones to cover all over the area on a planned floor location surrounded by the concrete continuous footing, and building a groundsill on the concrete continuous footing;
    (b) providing a ruler of any shape steel on the planned floor location so that the ruler can extend between the groundsills opposite each other and have its upper edge flush with that of the respective upper surfaces of the groundsills, the ruler serving as reference for flattening an underfloor concrete that is placed in step (c) below;
    (c) placing concrete for forming an underfloor concrete layer along the upper edge of the flattening tool on the planned floor location; and
    (d) after the underfloor concrete placed in step (3) becomes hardened, placing flooring finish boards or slabs on the upper surface of the underfloor concrete layer.

5. A floor construction for a wood structure or house, wherein the floor construction is designed to make a direct use of the stored heat in the earth, including:
    an outer circumferential groundsill surrounding an outer circumference of a structure or house being built;
    an inside groundsill provided inside the outer circumferential groundsill; and
    an underfloor concrete layer installed on a stone layer within each of the outer circumferential groundsill and inside groundsill, such that the underfloor concrete layer can have its upper surface flush with the respective upper edge of each of the groundsills; and
    flooring finish boards or slabs placed on the upper surface of the underfloor concrete layer; wherein
    the outer circumferential groundsill is built on a continuous footing made of concrete; and
    the inside groundsill is secured at each of opposite ends to a lateral side of the outer circumferential groundsill or to the lateral side of another inside groundsill provided adjacent to said inside groundsill, and is buried within the underfloor concrete layer, a part of the underfloor concrete layer at which said inside groundsill is buried having a projection extending downwardly from the underfloor concrete layer.

6. The floor construction for a wood structure or house as defined in claim 5, wherein the floor construction is designed to make a direct use of the stored heat in the earth, and wherein column or post mounting means is previously provided at the axial center of the upper surface of said inside groundsill.

* * * * *